No. 645,923. Patented Mar. 20, 1900.
C. W. TAYLOR.
DEVICE FOR EXTRACTING JUICES FROM FRUITS.
(Application filed Dec. 27, 1899.)
(No Model.)
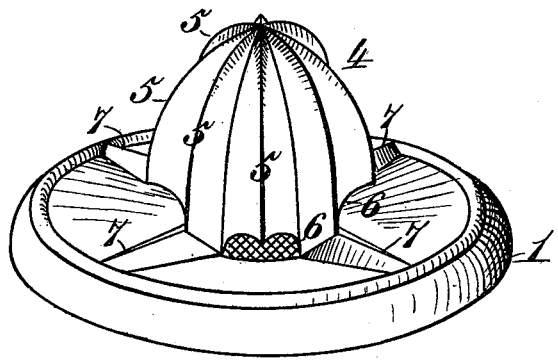
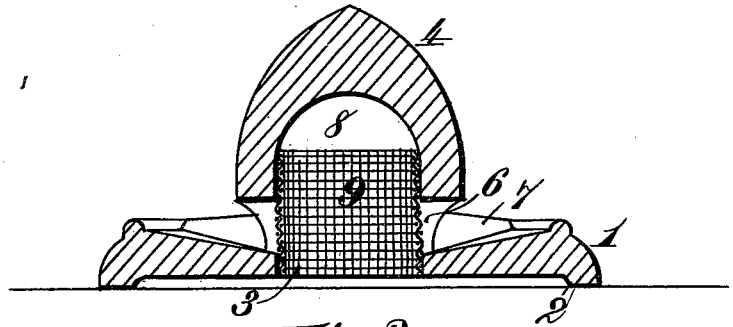
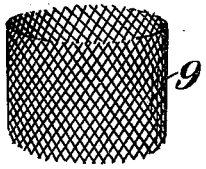
Witnesses.
Robert Everett,
Inventor.
Clarence W. Taylor.
By James L. Norris.
Atty

UNITED STATES PATENT OFFICE.

CLARENCE W. TAYLOR, OF SIOUX CITY, IOWA.

DEVICE FOR EXTRACTING JUICES FROM FRUITS.

SPECIFICATION forming part of Letters Patent No. 645,923, dated March 20, 1900.

Application filed December 27, 1899. Serial No. 741,757. (No model.)

*To all whom it may concern:*

Be it known that I, CLARENCE W. TAYLOR, a citizen of the United States, residing at Sioux City, in the county of Woodbury and State of Iowa, have invented new and useful Improvements in Devices for Extracting Juices from Fruits, of which the following is a specification.

My invention relates to an improved device for extracting juices from fruits, and has for its objects to provide a device of the character named with a novel strainer attachment and to provide for the removal of the strainer when it is not desired to use the same.

To this end the invention resides in the features of construction and combination or arrangement of parts hereinafter described, and particularly pointed out in the claim.

I have illustrated the invention in the accompanying drawings, in which—

Figure 1 is a perspective view of the device. Fig. 2 is a section through the same, and Fig. 3 is a perspective view of the strainer attachment.

The reference-numeral 1 indicates the base of the extractor, which is preferably circular, as shown, and of any desired circumference; but in practice said base would be made of a size to rest upon the mouth of an ordinary drinking-glass. For this purpose its under side is preferably formed with an annular circumferential shoulder 2 to extend around the rim of the glass. The upper side of the base 1 is inclined downwardly from or near the edge of the base to a central opening 3. Rising from the base 1 and from about the central opening 3 is a dome-shaped portion 4, provided around its outer surface with a series of sharpened vertically-disposed corrugations or blades 5, which converge at the center of the top of said dome. At equal distances apart and at four or more points about its circumference said dome has a portion of its wall adjacent to the base 1 cut away to provide a series of openings 6, leading to the central opening 3. The number of blades 5 on the dome and the number of openings 6 made in the wall thereof bear such relation to each other as that preferably a blade 5 shall extend downward to the base between two openings. Extending radially outward on the upper side of the base and forming continuations of these last-mentioned blades are four or more short blades 7. An orange, lemon, or similar fruit being cut in two and placed on the dome 4, the juice is extracted therefrom by the blades 5 and 7 by pressing the fruit down on the dome and revolving it back and forth thereon in the well-known manner.

The parts described may all be made as an integral structure and of any preferred material, such as glass, enameled tin, or the like.

The dome 4, as stated, is hollow and is provided with a circular cavity 8 of a size and alining with the opening 3 in the base. In order to provide for straining the juice as extracted, I employ a cylindrical wire-gauze strainer 9 and insert the same through the opening 3 and up into the cavity 8, in which position it is removably held by frictional engagement with the walls of said cavity and of said opening. As juice is extracted it must first pass through this strainer before it can run through the opening 3 to the receptacle. All pulp, sediment, seeds, and the like are thus prevented from being carried with the juice into the receptacle. Instead of wire-gauze the strainer may be constructed of any suitable foraminous material, and if metal is employed it may be coated or of a kind that will resist the action of acids.

In case the fruit from which the juice is to be extracted is seedless or for other reasons it should not be necessary to strain the juice and the free passage thereof to the receptacle is desired the strainer 9 may be removed by simply withdrawing it from the device. This will also facilitate cleaning the device.

Having thus fully described my invention, what I claim as new is—

In a juice-extractor of the class described, the combination with a base having a central opening and a hollow dome having circumferential apertures, of a cylindrical strainer removably secured in said dome and opening and extending over said apertures, substantially as described.

In testimony whereof I have hereunto set my hand in presence of two subscribing witnesses.

CLARENCE W. TAYLOR.

Witnesses:
R. H. BROWN,
W. G. MADDY.